US007004256B1

(12) United States Patent
Chatterji et al.

(10) Patent No.: US 7,004,256 B1
(45) Date of Patent: Feb. 28, 2006

(54) SET RETARDER COMPOSITIONS, CEMENT COMPOSITIONS, AND ASSOCIATED METHODS

(75) Inventors: Jiten Chatterji, Duncan, OK (US); James F. Heathman, Katy, TX (US); Dennis W. Gray, Comanche, OK (US); Bryan K. Waugh, Comanche, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/963,035

(22) Filed: Oct. 11, 2004

(51) Int. Cl.
*E21B 33/13* (2006.01)

(52) U.S. Cl. ............... 166/293; 106/808; 106/809; 106/810; 106/819; 106/823

(58) Field of Classification Search ............ 166/293
See application file for complete search history.

(56) References Cited

U.S. PATENT DOCUMENTS

| | | | |
|---|---|---|---|
| 2,805,719 A | 9/1957 | Anderson | |
| 2,905,565 A | 9/1959 | Dietz et al. | |
| 3,268,563 A | 8/1966 | Shen et al. | |
| 3,359,225 A | 12/1967 | Weisend | |
| 3,409,080 A | 11/1968 | Harrison | |
| 3,558,335 A | 1/1971 | Messenger | |
| 3,748,159 A | 7/1973 | George | |
| 3,753,748 A * | 8/1973 | Martin | 106/717 |
| 3,931,096 A * | 1/1976 | Guilbault et al. | 524/5 |
| 3,952,805 A | 4/1976 | Persinski et al. | |
| 4,011,092 A | 3/1977 | Yue | |
| 4,036,660 A | 7/1977 | Persinski et al. | |
| 4,190,454 A | 2/1980 | Yamagisi et al. | |
| 4,204,877 A | 5/1980 | Moorer et al. | |
| 4,234,344 A * | 11/1980 | Tinsley et al. | 106/672 |
| 4,476,029 A | 10/1984 | Sy et al. | |
| 4,500,357 A | 2/1985 | Brothers et al. | |
| 4,582,139 A | 4/1986 | Childs et al. | 166/293 |
| 4,601,758 A | 7/1986 | Nelson | |
| 4,648,453 A * | 3/1987 | Nagra et al. | 166/281 |
| 4,676,832 A | 6/1987 | Childs et al. | |
| 4,746,367 A | 5/1988 | Meyer | 106/314 |
| 4,818,288 A | 4/1989 | Aignesberger et al. | |
| 4,883,125 A | 11/1989 | Wilson et al. | |
| 4,941,536 A | 7/1990 | Brothers et al. | |
| 4,997,487 A | 3/1991 | Vinson et al. | 106/804 |
| 5,038,863 A | 8/1991 | Bloys et al. | |
| 5,049,288 A | 9/1991 | Brothers et al. | |
| 5,049,446 A | 9/1991 | Blackwell et al. | 428/364 |
| 5,076,852 A | 12/1991 | Bloys et al. | |
| 5,158,613 A * | 10/1992 | Sargeant et al. | 106/737 |
| 5,184,680 A * | 2/1993 | Totten et al. | 166/293 |
| 5,220,960 A | 6/1993 | Totten et al. | 166/293 |
| 5,221,343 A | 6/1993 | Grauer et al. | 106/729 |
| 5,263,542 A | 11/1993 | Brothers | 166/293 |
| 5,264,470 A | 11/1993 | Eoff | 424/4 |
| 5,273,580 A | 12/1993 | Totten et al. | 106/724 |
| 5,281,270 A | 1/1994 | Totten et al. | 106/687 |
| 5,293,938 A | 3/1994 | Onan et al. | 166/293 |
| 5,340,397 A | 8/1994 | Brothers | |
| 5,341,881 A | 8/1994 | Rodrigues et al. | 166/293 |
| 5,398,759 A | 3/1995 | Rodrigues et al. | 166/293 |
| 5,421,879 A | 6/1995 | Rodrigues | 106/727 |
| 5,421,881 A | 6/1995 | Rodrigues et al. | 106/809 |
| 5,447,197 A | 9/1995 | Rae et al. | 166/293 |
| 5,472,051 A | 12/1995 | Brothers | |
| 5,484,478 A | 1/1996 | Brothers | |
| 5,494,516 A | 2/1996 | Drs et al. | 106/819 |
| 5,503,671 A | 4/1996 | Casabonne et al. | 106/717 |
| 5,503,672 A | 4/1996 | Bartler-Gouedard et al. | 106/819 |
| 5,536,311 A | 7/1996 | Rodrigues | |
| 5,547,506 A | 8/1996 | Rae et al. | 106/730 |
| 5,547,612 A | 8/1996 | Austin et al. | |
| 5,609,681 A | 3/1997 | Drs et al. | 106/802 |
| 5,672,203 A | 9/1997 | Chatterji et al. | 166/808 |
| 5,698,512 A | 12/1997 | Austin et al. | |
| 5,850,880 A * | 12/1998 | Moran et al. | 166/293 |
| 5,871,577 A * | 2/1999 | Chatterji et al. | 106/808 |
| 5,932,344 A | 8/1999 | Ikemoto et al. | 428/343 |
| 5,989,336 A * | 11/1999 | Carpenter et al. | 106/811 |
| 6,019,835 A | 2/2000 | Chatterji et al. | 106/725 |
| 6,063,738 A | 5/2000 | Chatterji et al. | 507/269 |
| 6,077,910 A | 6/2000 | Ikuta et al. | 525/327.8 |
| 6,114,033 A | 9/2000 | Ikemoto et al. | 428/343 |
| 6,156,808 A | 12/2000 | Chatterji et al. | 516/116 |
| 6,173,778 B1 | 1/2001 | Rae et al. | 166/293 |
| 6,227,294 B1 | 5/2001 | Chatterji et al. | |
| 6,239,183 B1 * | 5/2001 | Farmer et al. | 516/102 |
| 6,268,406 B1 * | 7/2001 | Chatterji et al. | 523/130 |
| 6,297,202 B1 | 10/2001 | Chatterji et al. | 507/261 |

(Continued)

FOREIGN PATENT DOCUMENTS

GB     1588130     4/1981

OTHER PUBLICATIONS

Halliburton brochure entitled "CFR-2 Cement Friction Reducer" dated 1999.

(Continued)

*Primary Examiner*—George Suchfield
(74) *Attorney, Agent, or Firm*—Craig W. Roddy; Baker Botts L.L.P.

(57) ABSTRACT

Cement compositions, that comprise water, a cement, a strength-retrogression additive, and an acid, wherein the acid comprises ethylenediamine tetra acetic acid, nitrilotriacetic acid, or a combination thereof, are provided. Methods of cementing in a subterranean formation, methods of retarding the set time of a cement composition, and set retarder compositions also are provided.

58 Claims, No Drawings

U.S. PATENT DOCUMENTS

| | | | |
|---|---|---|---|
| 6,308,777 B1 | 10/2001 | Chatterji et al. | 166/293 |
| 6,376,580 B1 | 4/2002 | Ikuta et al. | 524/5 |
| 6,417,142 B1 | 7/2002 | Chatterji et al. | 507/265 |
| 6,419,016 B1 | 7/2002 | Reddy | 166/293 |
| 6,457,524 B1 | 10/2002 | Roddy | 166/293 |
| 6,497,283 B1 | 12/2002 | Eoff et al. | 166/293 |
| 6,511,537 B1 | 1/2003 | Barlet-Gouedard et al. | 106/727 |
| 6,626,242 B1 * | 9/2003 | D'Almeida et al. | 166/292 |
| 6,630,021 B1 | 10/2003 | Reddy et al. | 106/809 |
| 6,689,208 B1 | 2/2004 | Brothers | 106/794 |
| 6,715,552 B1 | 4/2004 | Eoff et al. | 166/293 |
| 6,722,433 B1 | 4/2004 | Brothers et al. | 166/288 |
| 6,743,288 B1 | 6/2004 | Eoff et al. | 106/724 |
| 6,770,604 B1 | 8/2004 | Reddy et al. | 507/224 |
| 6,793,730 B1 | 9/2004 | Reddy et al. | 106/677 |
| 6,796,378 B1 | 9/2004 | Reddy et al. | 166/293 |

OTHER PUBLICATIONS

Halliburton brochure entitled "CFR-3™ Cement Friction Reducer" dated 2004.

Halliburton brochure entitled "EZ-FLO Blending Additive" dated 2000.

Halliburton brochure entitled "GasStop HT Cement Additive" dated 1999.

Halliburton brochure entitled "Halad®-413 Fluid-Loss Additive" dated 1999.

Halliburton brochure entitled "Hi-Dense® Weight Additives" dated 1998.

Halliburton brochure entitled "HR®-25 Cement Retarder" dated 1999.

Halliburton brochure entitled "MICROMAX Weight Additive" dated 1999.

Halliburton brochure entitled "SCR-100 Cement Retarder" dated 1999.

Halliburton brochure entitled "SCR-500L™ High-Temperature Retarder" dated 2000.

Halliburton brochure entitled "SSA-1 Strength-Stabilizing Agent" dated 1998.

Halliburton brochure entitled "SSA-2 Coarse Silica Flour" dated 1999.

* cited by examiner

US 7,004,256 B1

SET RETARDER COMPOSITIONS, CEMENT COMPOSITIONS, AND ASSOCIATED METHODS

CROSS REFERENCE TO RELATED APPLICATIONS

The present invention is related to U.S. Ser. No. 10/963,036 entitled "Methods of Cementing in Subterranean Formations" filed on even date herewith, which is assigned to the assignee of the present invention, the entire disclosure of which is incorporated herein by reference.

BACKGROUND

The present invention relates to cementing operations, and more particularly, to set retarder compositions that comprise ethylenediamine tetra acetic acid and/or nitrilotriacetic acid, cement compositions that comprise the set retarder compositions, and associated methods.

Cement compositions are commonly utilized in subterranean operations, particularly subterranean well completion and remedial operations. For example, cement compositions are used in primary cementing operations whereby pipe strings such as casings and liners are cemented in well bores. In performing primary cementing, cement compositions are pumped into the annular space between the walls of a well bore and the exterior surface of a pipe string disposed therein. The cement composition is permitted to set in the annular space, thereby forming an annular sheath of hardened substantially impermeable cement therein that supports and positions the pipe string in the well bore and bonds the exterior surface of the pipe string to the walls of the well bore. Cement compositions also are used in remedial cementing operations such as plugging highly permeable zones or fractures in well bores, plugging cracks and holes in pipe strings, and the like.

These cementing operations generally occur under a wide variety of well bore conditions, for example, ranging from shallow wells (less than about 1,000 feet) to extremely deep wells (greater than about 35,000 feet). Generally, the cement composition should remain in a pumpable state until the cement composition has been placed into the desired location. To retard the set time of the cement composition, conventional set retarder compositions have been included therein. As used herein, the phrase "conventional set retarder compositions" refers to a wide variety of compositions commonly used in cementing operations for delaying the set time of a cement composition, including lignosulfates, hydroxycarboxy acids, phosphonic acid derivatives, synthetic polymers (e.g., copolymers of 2-acrylamido-2-methylpropane sulfonic acid ("AMPS")), borate salts, and combinations thereof. As used herein, the term "copolymer" refers to a polymer comprising two or more different monomers. Certain of these conventional set retarder compositions (e.g., synthetic polymers) may be costly to produce, which may add an undesired expense to the cementing operation. Further as temperatures encountered downhole increase, higher concentrations of the conventional set retarder compositions may be required to achieve a desirable level of set retardation, which, in turn, may lead to additional undesired expense to the cement operation. Even further, these conventional set retarder compositions may not provide a desired level of set retardation, for example, in wells having bottom hole circulating temperatures ("BHCT") above about 450° F. Therefore, these temperatures limit the temperatures at which a cement composition may be pumped using conventional set retarder compositions and, thus, limit the depths and associated temperatures at which well bores may be drilled and isolated with a cement composition placed in the annulus.

SUMMARY

The present invention relates to cementing operations, and more particularly, to set retarder compositions that comprise ethylenediamine tetra acetic acid and/or nitrilotriacetic acid, cement compositions that comprise the set retarder compositions, and associated methods.

In one embodiment, the present invention provides a method of cementing in a subterranean formation penetrated by a well bore that comprises providing a cement composition comprising water, a cement, a strength-retrogression additive, and an acid, wherein the acid comprises ethylenediamine tetra acetic acid, nitrilotriacetic acid, or a combination thereof; introducing the cement composition into the subterranean formation; and allowing the cement composition to set therein.

In another embodiment, the present invention provides a method of retarding the set time of a cement composition that comprises adding to the cement composition an acid, wherein the acid comprises ethylenediamine tetra acetic acid, nitrilotriacetic acid, or a combination thereof.

In another embodiment, the present invention provides a cement composition that comprises water, a cement, a strength-retrogression additive, an acid, wherein the acid comprises ethylenediamine tetra acetic acid, nitrilotriacetic acid, or a combination thereof.

In yet another embodiment, the present invention provides a set retarder composition that comprises an acid, wherein the acid comprises ethylenediamine tetra acetic acid, nitrilotriacetic acid, or a combination thereof.

The objects, features and advantages of the present invention will be readily apparent to those skilled in the art upon a reading of the description of the specific embodiments that follows.

DESCRIPTION

The present invention relates to cementing operations, and more particularly, to set retarder compositions that comprise ethylenediamine tetra acetic acid and/or nitrilotriacetic acid, cement compositions that comprise the set retarder compositions, and associated methods. While the methods and compositions of the present invention may be useful in a variety of subterranean cementing operations, they are particularly useful for cementing operations in well bores having BHCTs greater than about 450° F., among other things, due to desirable properties (e.g., placement time) of the cement compositions of the present invention.

The cement compositions of the present invention generally comprise water, a cement, a strength-retrogression additive, and an acid, wherein the acid comprises ethylenediamine tetra acetic acid ("EDTA"), nitrilotriacetic acid ("NTA"), or a combination thereof. In some embodiments, the cement compositions of the present invention further may comprise a conventional set retarder composition and/or a copolymer that comprises olefinically unsaturated nonacrylate sulfonate ("OUS") monomers and olefinically unsaturated carboxylic acid ("OUC") monomers (e.g., styrene sulfonic acid and maleic anhydride). As used herein, the phrase "strength-retrogression additive" refers to materials (e.g., crystalline silica) that are capable of preventing the strength retrogression of a set cement composition when exposed to high temperatures. Generally, the cement compositions of the present invention should be useful in cementing operations in well bores having a BHCT of up to about 700° F. In some embodiments, the cement compositions of the present invention may be used in well bores where some delay in the set time of the cement composition is desired, for example, in well bores having a BHCT of greater than about 200° F. In some embodiments, the cement compositions of the present invention may be used in well bores having a BHCT in the range of from about 450° F. to about 700° F. The inclusion of copolymers comprising OUS monomers and OUC monomers in the cement compositions of the present invention may provide desirable levels of set retardation in well bores having BHCTs above about 525° F.

Generally, the cement compositions of the present invention may have a density suitable for a particular application. In one embodiment, the cement compositions of the present invention may range in density from about 12 pounds per gallon ("ppg") to about 30 ppg. In yet another embodiment, the cement compositions of the present invention may range in density from about 17 ppg to about 21 ppg.

Suitable water for use in the cement compositions of the present invention includes fresh water, saltwater (e.g., water containing one or more salts dissolved therein), brine (e.g., saturated saltwater), or seawater. Generally, the water may be from any source provided that it does not contain an excess of compounds that adversely affect the cement compositions. The water maybe present in an amount sufficient to form a pumpable slurry. Generally, the water is present in the cement compositions of the present invention in an amount in the range of from about 33% to about 200% by weight of cement ("bwoc") therein. In certain embodiments, the water is present in the cement compositions of the present invention in an amount in the range of from about 35% to about 60% bwoc therein.

Any cements suitable for use in subterranean applications are suitable for use in the present invention. In one embodiment, the improved cement compositions of the present invention comprise a hydraulic cement. A variety of hydraulic cements are suitable for use including those comprised of calcium, aluminum, silicon, oxygen, and/or sulfur, which set and harden by reaction with water. Such hydraulic cements include, but are not limited to, Portland cements, pozzolanic cements, gypsum cements, high alumina content cements, silica cements, combinations thereof, and the like.

Any strength-retrogression additive suitable for use in subterranean applications may be included in the cement compositions of the present invention. Strength retrogression agents generally are included in the cement composition of the present invention, among other things, to prevent high-temperature strength retrogression that occurs to set cement compositions in high-temperature wells, for example, wells with a BHCT that exceeds about 230° F. Examples of suitable strength-retrogression additives include crystalline silica, such as, e.g., coarse grain crystalline silica, fine grain crystalline silica, or a combination thereof. An example of a suitable fine grain crystalline silica is "SSA-1" strength stabilization agent, commercially available from Halliburton Energy Services, Inc., Duncan, Okla. An example of a suitable course grain crystalline silica is "SSA-2" strength stabilization agent, commercially available from Halliburton Energy Services, Inc., Duncan, Okla. Generally, a strength-retrogression additive may be included in the cement compositions of the present invention in an amount sufficient to provide the desired level of strength retrogression prevention. In some embodiments, a strength-retrogression additive may be included in the cement compositions of the present invention in an amount in the range of from about 30% to about 80% bwoc. Those of ordinary skill in the art, with the benefit of this disclosure, will be able to select the appropriate type and amount of the strength regression additive to include in the cement compositions of the present invention for a particular application.

The conventional set retarder composition that may be included in the cement compositions of the present invention may include any conventional set retarder composition suitable for use in subterranean operations. Conventional set retarder compositions are generally included in the cement compositions of the present invention to retard the set time thereof. Examples of suitable conventional set retarder compositions include lignosulfates ("LS"), hydroxycarboxy acids, phosphonic acid derivatives, borate salts, synthetic polymers, and combinations thereof. Examples of suitable hydroxycarboxy acids include tartaric acid, gluconic acid, citric acid, gluconoheptanoic acid, combinations thereof, and the like. An example of a suitable hydroxycarboxy acid is commercially available as "HR™-25" retarder from Halliburton Energy Services, Inc., Duncan, Okla. Suitable synthetic polymers include a wide variety of synthetic polymers that may be used to delay the set time of a cement composition in cementing operations, including copolymers comprising an AMPS monomer and at least one monomer chosen from acrylic acid, methacaylic acid, itaconic acid, or maleic acid. Examples of suitable synthetic polymers are commercially available as "SCR™-100" retarder from Halliburton Energy Services, Inc., Duncan, Okla., which is described in U.S. Pat. Nos. 4,941,536; 5,049,288; 5,472,051, the relevant disclosures of which are incorporated herein by reference, and as "SCR™-500" retarder from Halliburton Energy Services, Inc., Duncan, Okla., which is described in U.S. Pat. No. 5,536,311, the relevant disclosure of which is incorporated herein by reference. In some embodiments, the conventional set retarder composition comprises borate salts. Examples of suitable borate salts include potassium pentaborate, sodium tetraborate, borax, combinations thereof, and the like. An example of a suitable borate salt is commercially available as "COMPONENT™" additive from Halliburton Energy Services, Inc., Duncan, Okla. An example of a conventional set retarder composition comprising a phosphonic acid derivative is commercially available as "Micro Matri™" cement retarder from Halliburton Energy Services, Inc., Duncan, Okla., which is described in U.S. Pat. Nos. 5,340,397 and 5,484,478, the relevant disclosures of which are incorporated herein by reference. In some embodiments, the conventional set retarder composition comprises combinations of the above-listed compositions. An example of a suitable combination is a conventional set retarder composition that comprises calcium LS and gluconic acid, an example of which is commercially available as "HR-12™" retarder, from Halliburton Energy Services, Inc., Duncan, Okla., in a 75:25 calcium LS to gluconic acid weight ratio. One of ordinary skill in the art will be able to determine other suitable conventional set retarder compositions that may be used in the cement compositions of the present invention.

The amount of a particular conventional set retarder composition to include generally depends on a number of factors, including the BHCT and bottom hole pressure of the well bore, the particular conventional set retarder composition chosen, the cement composition of the present invention containing the conventional set retarder composition, and other factors known to those of ordinary skill in the art. As those of ordinary skill in the art, with the benefit of this disclosure, will appreciate higher concentrations of the conventional set retarder composition may be needed with increasing BHCT. In some embodiments, the quantity of the conventional set retarder composition to be included in a cement composition of the present invention may be determined prior to preparation of the cement composition. For example, the quantity of a conventional set retarder composition to be included in a cement composition of the present invention may be determined by performing thickening time tests of the type described in API Recommended Practices 10B, Procedure 9, Twenty-Second Edition, December 1997. More particularly, in certain embodiments, a conventional set retarder composition is present in the cement compositions of the present invention in an amount in the range of from about 0.01% to about 10% bwoc. In some embodiments, a conventional set retarder composition is present in the cement compositions of the present invention in an amount in the range of from about 0.1% to about 6% bwoc.

The cement compositions of the present invention further comprise EDTA and/or NTA. Among other things, EDTA and/or NTA may be included in the cement compositions of the present invention so the cement compositions may have desirable levels of set retardation, for example, in well bores having a BHCT of greater than about 450° F. Further, inclusion of EDTA and/or NTA may reduce the amount of a conventional set retarder composition that may be needed to achieve a desired level of set retardation, thereby possibly reducing the expense associated with the cementing operation, for example, where a synthetic polymer is included in the conventional set retarder composition.

Generally, the EDTA and/or NTA should be included in the cement compositions of the present invention in an amount sufficient to provide the desired level of set retardation in the cement compositions of the present invention, based on a number of factors including the amount and composition of the convention set retarder compositions, desired placement time, and the BHCT and bottom hole pressure of the well bore. As those of ordinary skill in the art, with the benefit of this disclosure, will appreciate higher concentrations of the conventional EDTA and/or NTA may be needed with increasing BHCT. In some embodiments, the quantity of the EDTA and/or NTA to be included in a cement composition of the present invention may be determined prior to preparation of the cement composition. For example, the quantity of a conventional set retarder composition to be included in a cement composition of the present invention may be determined by performing thickening time tests of the type described in API Recommended Practices 10B, Procedure 9, Twenty-Second Edition, December 1997. In some embodiments, the EDTA may be present in the cement compositions of the present invention in an amount in the range of from about 0.01% to about 10% bwoc. In some embodiments, the EDTA may be present in the cement compositions of the present invention in an amount in the range of from about 0.01% to about 6% bwoc. In some embodiments, the NTA may be present in the cement compositions of the present invention in an amount in the range of from about 0.01% to about 10% bwoc. In some embodiments, the NTA may be present in the cement compositions of the present invention in an amount in the range of from about 0.01% to about 6% bwoc. In some embodiments, where used in combination, the EDTA and the NTA may be present in the cement compositions of the present invention in an amount in the range of from about 0.01% to about 10% bwoc. In some embodiments, where used in combination, the EDTA and NTA may be present in the cement compositions of the present invention in an amount in the range of from about 0.01% to about 6% bwoc. Generally, where used in combination, the ratio of the EDTA to the NTA may vary based on a number of factors including, the desired set time, desired placement time, BHCT, and a variety of other factors known to those of ordinary skill in the art. In some embodiments, the ratio of the EDTA to the NTA may be in the range of from about 1:5 by weight to about 5:1 to weight. In some embodiments, the ratio of the EDTA to the NTA may be in the range of from about 1:2 by weight to about 2:1 to weight.

The cement compositions of the present invention optionally may comprise a copolymer that comprises OUS monomers and OUC monomers. Inclusion of these copolymers in the cement compositions of the present invention, among other things, may provide desirable levels of set retardation in well bores having BHCTs over about 525° F. A specific example of a suitable copolymer that comprises OUS monomers and OUC monomers is a styrene sulfonic acid and maleic anhydride ("SSMA") copolymer. An example of a suitable SSMA copolymer having a styrene monomer to maleic anhydride mole ratio of about 1:1 is commercially available as "NARLEX® D-72" polymer. In another embodiment, aqueous solutions of the above polymers containing up to about 50% polymer by weight are used. Further, numerous salts of the copolymer may be made by methods well known in the art. As used herein, the term "copolymer" is intended to include the acid form of the copolymer as well as its various salts.

The OUS monomers suitable for use in the present invention include sulfonated monomers that do not contain base-degradable functional groups, for example amides or esters. Examples of suitable OUS monomers include sulfonated styrene, vinyltoluenesulfonic acid, vinylnapthalenesulfonic acid, allyloxylbenzenesulfonic acid, 3-allyloxy-2-hydroxypropane sulfonic acid, and allylsulfonic acid. These monomers may used in the acid or salt form. In some embodiments, when the monomers are used in the acid form, the final copolymer may be neutralized prior to use.

As used herein, an OUC monomer is intended to include aliphatic, branched or cyclic, mono-, di-, or tri- carboxylic acids, the alkali or alkaline earth metal salts thereof, and the amides, esters, imides and anhydrides thereof. Suitable OUC monomers should be copolymerizable with an OUS monomer. Examples of suitable OUC monomers include acrylic acid, alkyl acrylic acids, for example methacrylic acid and ethacrylic acid; alpha-chloro-acrylic acid, alpha-cyano acrylic acid, alpha-chloro-methacrylic acid, alpha-cyano methacrylic acid, crotonic acid, alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, maleic acid, citraconic acid, mesaconic acid, glutaconic acid, aconitic acid, fumaric acid, and tricarboxy ethylene. Of these, maleic acid; maleimide; diesters, monoester, and amide derivatives of maleic acid; unsubstituted acrylic acid and derivatives thereof; and alkyl acrylic acid and derivatives thereof are preferred.

The ratio of the OUS monomers to the OUC monomers in the copolymer may vary dependent on a number of factors, including the particular monomers chosen and the desired level of set retardation. In some embodiments, the mole ratio of the OUS monomers to OUC monomers may be in the range of from about 100:1 to about 1:100. In some embodiments, the mole ratio of the OUS monomers to OUC monomers may be in the range of from about 3:1 to about 1:3. In some embodiments, the mole ratio of the OUS monomers to OUC monomers may be about 1:1.

Generally, the copolymer that comprises OUS monomers and OUC monomers should be included in the cement compositions of the present invention in an amount sufficient to provide a desired level of set retardation. In some embodiments, the copolymer that comprises OUS monomers and OUC monomers is included in the cement compositions of the present invention in an amount in the range of from about 0.01% bwoc to about 10% bwoc. In some embodiments, the copolymer that comprises OUS monomers and OUC monomer is included in the cement compositions of the present invention in an amount in the range of from about 0.01% bwoc to about 6% bwoc.

Optionally, the cement compositions of the present invention further may comprise a dispersant. Where present, the dispersant acts, among other things, to control the rheology of the cement composition. While a variety of dispersants known to those skilled in the art may be used in accordance with the present invention, a suitable dispersant comprises a water-soluble polymer prepared by the condensation of formaldehyde with acetone and sodium bisulfite. Such a dispersant is commercially available as "CFR™-3" dispersant from Halliburton Energy Services, Inc., Duncan, Okla. Another suitable dispersant comprises a sodium salt of naphthalene sulfonic acid condensed with formaldehyde, an example of which is commercially available as "CFR™-2" dispersant also from Halliburton Energy Services, Inc., Duncan, Okla. Another suitable dispersant comprises gluconic acid, an example of which is commercially available as "CFR™-1" dispersant also from Halliburton Energy Services, Inc., Duncan, Okla. Where used, the dispersant should be present in the cement compositions of the present invention in an amount sufficient to improve the rheology of the cement composition. In some embodiments, the dispersant is present in the cement compositions of the present invention in an amount in the range of from about 0.1% to about 5% bwoc. In some embodiments, the dispersant is present in the cement compositions of the present invention in an amount in the range of from about 0.1% to about 3% bwoc.

As will be recognized by those skilled in the art, the cement compositions of this invention also may include additional suitable additives, such as, for example, defoamers, fibers, fluid loss control additives, weighting materials, salts, vitrified shale, fly ash, combinations thereof, and the like. Weighting materials may be included in the cement compositions of the present invention to provide a desired density. Examples of suitable weighting materials include iron oxides and oxides of manganese. An example of a suitable weighting material comprising oxide of manganese is commercially available as "MICROMAX®" from Elkem Materials, Inc., Pittsburgh, Pa. An example of a suitable weighting material comprising iron oxide is commercially available as "Hi-Dense® No. 4" cement weighting additive from Halliburton Energy Services, Inc., Duncan, Okla. One of ordinary skill in the art with the benefit of this disclosure will be able to recognize where a particular additive is suitable for a particular application.

The cement compositions of the present invention may be prepared using any suitable technique for the preparation of cement compositions. In some embodiments, the EDTA and/or NTA may be dry blended with the cement together with other additives (e.g., the conventional set retarder composition, the copolymer comprising OUS monomers and OUC monomers, and the like). In other embodiments, salts of EDTA and/or NTA may be added to the water used to make the cement composition. In yet other embodiments, the EDTA and/or NTA may be dry blended with the silica and then combined with the cement by any suitable technique. One of ordinary skill in the art, with the benefit of this disclosure, will be able to prepare a cement composition suitable for use in a particular application.

In one embodiment, the present invention provides a method of cementing in a subterranean formation penetrated by a well bore that comprises providing a cement composition comprising water, a cement, a strength-retrogression additive, and an acid, wherein the acid comprises EDTA, NTA, or a combination thereof; introducing the cement composition into the subterranean formation; and allowing the cement composition to set therein.

In another embodiment, the present invention provides a method retarding the set time of a cement composition that comprises adding to the cement composition an acid, wherein the acid comprises EDTA, NTA, or a combination thereof.

In another embodiment, the present invention provides a cement composition that comprises water, a cement, a strength-retrogression additive, an acid, wherein the acid comprises EDTA, NTA, or a combination thereof.

In yet another embodiment, the present invention provides a set retarder composition that comprises an acid, wherein the acid comprises EDTA, NTA, or a combination thereof. In some embodiments, the set retarder composition may further comprise a copolymer that comprises OUS monomers and OUC monomers.

To facilitate a better understanding of the present invention, the following illustrative example of some of the certain embodiments are given. In no way should such example be read to limit, or define, the scope of the invention.

EXAMPLE

Sample compositions were prepared according to the following procedure. Each sample was dry blended, then blended with water for 15 seconds at 4,000 rpm in a Waring Blendor, and then mixed for 35 seconds at 12,000 rpm in the Waring Blendor. After sample preparation, thickening time tests were performed on each of the samples using a High-Temperature/High-Pressure consistometer according to API Recommended Practices 10B, Procedure 9, Twenty-Second Edition, December 1997. While the thickening time test was being performed, each sample composition was brought up to $T_{Test}$ and 32,000 psi, unless otherwise noted, in the time listed in the tables below.

For each of Test Nos. 1–3, a summary of the sample composition and thickening times at $T_{Test}$ between 500° F. and 545° F. is provided below in Table 1. The sample compositions utilized in Test Nos. 1–3 are comparative cement compositions that comprise a conventional set retarder composition.

TABLE 1

| | 500° F. to 545° F. Tests | | |
|---|---|---|---|
| TEST NO. | Test No. 1 | Test No. 2 | Test No. 3 |
| Class H Cement (lbs/sack) | 94 | 94 | 94 |
| % SSA-1 bwoc | 10 | 10 | 10 |
| % SSA-2 bwoc | 30 | 30 | 30 |
| Hi-Dense ® No. 4 lbs/sk | 65 | 0 | 0 |
| MicroMax ® lbs/sk | 0 | 100 | 75 |
| % NaCl bwow | 18 | 18 | 18 |
| % SCR ™-500 bwoc | 5 | 5 | 5 |
| % HR ®-25 bwoc | 5 | 5 | 5 |

TABLE 1-continued

500° F. to 545° F. Tests

| TEST NO. | Test No. 1 | Test No. 2 | Test No. 3 |
|---|---|---|---|
| % CFR ™-1 bwoc | 0 | 5 | 0 |
| % Gasstop ™ HT[1] bwoc | 0.8 | 0 | 0.8 |
| % EZ-FLO ™ [1] bwoc | 0.07 | 0.07 | 0.07 |
| Water (gal/sack) | 6.16 | 7.46 | 6.51 |
| Density (lb/gal) | 19 | 19 | 19 |
| Yield (ft³/sack) | 1.88 | 2.25 | 1.98 |
| Minutes to $T_{Test}$ | 90 | 90 | 90 |
| $T_{Test}$ (° F.) | 500 | 500 | 545 |
| Thickening Time (hr:min) | 6:38 | 1:38 | 1:51 |

[1]Gasstop ™ HT cement additive is a gas migration and fluid loss control additive that is commercially available from Halliburton Energy Services, Inc., Duncan, Oklahoma.
[2]EZ-FLO ™ cement additive is a flow enhancer that is commercially available from Halliburton Energy Services, Duncan, Oklahoma.

For each of Test Nos. 4–9, a summary of the sample composition and thickening times at a $T_{Test}$ of 575° F. is provided below in Table 2. The sample compositions utilized in Test Nos. 4–9 are comparative cement compositions that comprise a conventional set retarder composition.

TABLE 2

575° F. Tests

| TEST NO. | Test No. 4 | Test No. 5 | Test No. 6 | Test No. 7[1] | Test No. 8 | Test No. 9 |
|---|---|---|---|---|---|---|
| Class H Cement (lbs/sack) | 94 | 94 | 94 | 94 | 94 | 94 |
| % SSA-1 bwoc | 0 | 0 | 0 | 10 | 10 | 10 |
| % SSA-2 bwoc | 35 | 40 | 0 | 30 | 30 | 30 |
| Hi-Dense ® No. 4 lbs/sk | 68.8 | 70 | 0 | 0 | 0 | 0 |
| MicroMax ® lbs/sk | 0 | 0 | 0 | 75 | 80 | 35 |
| % NaCl bwow | 0 | 0 | 0 | 18 | 55 | 18 |
| % SCR ™-500 bwoc | 0 | 0 | 0 | 5 | 5 | 3 |
| % HR ®-12 bwoc | 6 | 6 | 6 | 0 | 0 | 0 |
| % HR ®-25 bwoc | 0 | 0 | 0 | 5 | 5 | 0 |
| % COMPONENT R ™ bwoc | 6 | 3 | 6 | 0 | 0 | 3 |
| Micro Matrix ™ Cement Retarder (gal/sk) | 0 | 0 | 0 | 0 | 0 | 2 |
| % Gasstop ™ HT % bwoc | 0 | 0.8 | 0 | 0.8 | 0.8 | 0.8 |
| % EZ-FLO ™ bwoc | 0 | 0.07 | 0 | 0.07 | 0.07 | 0.07 |
| % Diacel ® LWL bwoc[2] | 0 | 1 | 0 | 0 | 0 | 0 |
| Water (gal/sack) | 6 | 6 | 4.15 | 6.51 | 6.79 | 2.85 |
| Density (lb/gal) | 19 | 19 | 16.2 | 19 | 19 | 19 |
| Yield (ft³/sack) | 1.79 | 1.84 | 1.15 | 1.98 | 2.18 | 1.25 |
| Minutes to $T_{Test}$ | 90 | 90 | 90 | 90 | 90 | 90 |
| $T_{Test}$ (° F.) | 575 | 575 | 575 | 575 | 575 | 575 |
| Thickening Time (hr:min) | 1:45 | 1:08 | 1:19 | 1:55 | 1:10 | 3:12[3] |

[1]The sample composition used in Test No. 7 was the same as the sample composition used in Test No. 3.
[2]Diacel ® LWL Cement Fluid-Loss/Retarder Additive is a bi-functional additive that may be effective as both a fluid loss control additive and a set retarder composition. It is commercially available from Chevron Phillips Chemical Company LP, The Woodlands, Texas.
[3]Test No. 9 was performed at 22,500 psi.

For each of Test Nos. 10–15, a summary of the sample composition and thickening times at a $T_{Test}$ between 475° F. and 525° F. is provided below in Table 3. The sample compositions utilized in Test Nos. 10–15 are cement compositions of the present invention that comprise a conventional set retarder composition and EDTA or NTA.

TABLE 3

475° F. to 525° F. Tests

| TEST NO. | Test No. 10[1] | Test No. 11[1] | Test No. 12 | Test No. 13 | Test No. 14 | Test No. 15 |
|---|---|---|---|---|---|---|
| Class H Cement (lbs/sack) | 94 | 94 | 94 | 94 | 94 | 94 |
| % SSA-1 bwoc | 10 | 10 | 10 | 10 | 10 | 10 |
| % SSA-2 bwoc | 30 | 30 | 30 | 30 | 30 | 30 |
| MicroMax ® lbs/sk | 90 | 90 | 75 | 90 | 90 | 90 |
| % NaCl bwow | 18 | 18 | 18 | 18 | 18 | 18 |
| % EDTA bwoc | 0 | 0 | 2.4 | 6 | 5 | 5 |
| % NTA bwoc | 6 | 6 | 0 | 0 | 0 | 0 |
| % SCR ™-500 bwoc | 5 | 5 | 0 | 5 | 0 | 5 |
| % HR-25 bwoc | 5 | 5 | 5 | 5 | 5 | 5 |
| % CFR ™-3 bwoc | 0 | 0 | 0 | 2 | 0 | 0 |
| % CFR ™-1 bwoc | 0 | 0 | 0 | 0 | 0 | 0 |
| % Gasstop ™ HT bwoc | 0 | 0 | 0 | 0.8 | 0 | 0.8 |
| % EZ-FLO ™ bwoc | 0.07 | 0.07 | 0.07 | 0.07 | 0.07 | 0.07 |
| Water (gal/sack) | 7.37 | 7.37 | 6.56 | 7.3 | 7.39 | 7.36 |
| Density (lb/gal) | 19 | 19 | 19 | 19 | 18 | 19 |
| Yield (ft³/sack) | 2.18 | 2.18 | 1.99 | 2.18 | 2.17 | 2.17 |
| Minutes to $T_{Test}$ | 90 | 90 | 90 | 100 | 90 | 100 |
| $T_{Test}$ (° F.) | 475° F. | 500° F. | 500 | 500 | 500 | 525 |
| Thickening Time (hr:min) | 6:00+[2] | 6:00+[2] | 1:28 | 4:45 | 8:00+[2] | 3:58 |

[1]Tests No. 10 and No. 11 were performed at 27,000 psi.
[2]For Test Nos. 10, 11, and 14, the heat was turned off at the indicated time and cooled overnight (about 12 hours). When the slurry cap was opened, the sample was set hard.

For each of Test Nos. 16–19, a summary of the sample composition and thickening times at a $T_{Test}$ between 550° F. and 575° F. is provided below in Table 4. The sample compositions utilized in Test Nos. 16–19 are cement compositions of the present invention that comprise a conventional set retarder composition and acid, wherein the acid comprises EDTA, NTA, or a combination thereof.

TABLE 4

550° F. to 575° F. Tests

| TEST NO. | Test No. 16[1] | Test No. 17 | Test No. 18 | Test No. 19[2] |
|---|---|---|---|---|
| Class H Cement (lbs/sack) | 94 | 94 | 94 | 94 |
| % SSA-1 bwoc | 10 | 10 | 10 | 25 |
| % SSA-2 bwoc | 30 | 30 | 30 | 30 |
| MicroMax ® lbs/sk | 90 | 90 | 90 | 90 |
| % NaCl bwow | 18 | 18 | 18 | 18 |
| % EDTA bwoc | 0 | 6 | 5 | 5 |
| % NTA bwoc | 6 | 0 | 1 | 0 |
| % SCR ™-500 bwoc | 5 | 5 | 0 | 0 |
| % HR ®-25 bwoc | 5 | 5 | 5 | 5 |
| % COMPONENT R ® bwoc | 0 | 0 | 0 | 0 |
| % CFR ™-3 bwoc | 0 | 2.5 | 0 | 0 |
| % Gasstop ™ HT bwoc | 0 | 0.8 | 0.8 | 0 |
| % EZ-FLO ™ bwoc | 0.07 | 0.07 | 0.07 | 0.07 |
| Water (gal/sack) | 7.37 | 7.2 | 7.37 | 7.39 |
| Density (lb/gal) | 19 | 19 | 19 | 18 |
| Yield (ft³/sack) | 2.18 | 2.18 | 2.18 | 2.17 |
| Minutes to $T_{Test}$ | 100 | 100 | 100 | 90 |

TABLE 4-continued

550° F. to 575° F. Tests

| TEST NO. | Test No. 16[1] | Test No. 17 | Test No. 18 | Test No. 19[2] |
|---|---|---|---|---|
| $T_{Test}$ (° F.) | 550 | 550 | 550 | 575 |
| Thickening Time (hr:min) | 1:37 | 1:46 | 1:46 | 1:52 |

[1]The sample composition used in Test No. 16 was the same as the sample compositions used in Test Nos 10 and 11.
[2]The sample composition used in Test No. 19 was the same as the sample composition used in Test No. 14.

For each of Test Nos. 20–23, a summary of the sample composition and thickening times at a $T_{Test}$ of 575° F. is provided below in Table 5. Test Nos. 20 and 22–23 are cement compositions of the present invention that comprise a conventional set retarder composition, EDTA, and a SSMA copolymer. Sample No. 21 is a cement composition of the present invention that comprises a conventional set retarder composition, NTA, and a SSMA copolymer.

TABLE 5

575° F. Tests

| TEST NO. | Test No. 20 | Test No. 21 | Test No. 22 | Test No. 23 |
|---|---|---|---|---|
| Class H Cement (lbs/sack) | 94 | 94 | 94 | 94 |
| % SSA-1 bwoc | 10 | 10 | 10 | 10 |
| % SSA-2 bwoc | 30 | 30 | 30 | 30 |
| Hi-Dense ® No. 4 lbs/sk | 65 | 65 | 65 | 65 |
| % NaCl bwow | 18 | 18 | 18 | 18 |
| % Narlex ® D-72 bwoc | 4 | 4 | 5 | 5 |
| % EDTA bwoc | 1 | 0 | 5 | 5 |
| % NTA bwoc | 0 | 1 | 0 | 0 |
| %HR ®-25 bwoc | 5 | 5 | 0 | 5 |
| % CFR ™-3 bwoc | 4 | 0 | 0 | 0 |
| % EZ-FLO bwoc | 0.07 | 0.07 | 0.07 | 0.07 |
| Water (gal/sack) | 6.03 | 6.08 | 6.22 | 6.09 |
| Density (lb/gal) | 19 | 19 | 19 | 19 |
| Yield (ft³/sack) | 1.84 | 1.84 | 1.85 | 1.88 |
| Minutes to $T_{Test}$ | 199 | 90 | 90 | 90 |
| $T_{Test}$ (° F.) | 575 | 575 | 575 | 575 |
| Thickening Time (hr:min) | 4:00 | 3:25 | 2:24 | 3:01 |

Therefore, this example indicates, among other things, that the use of cement compositions of the present invention, that comprise water, a cement, a strength-retrogression additive, a conventional set retarder composition, and an acid, wherein the acid comprises EDTA, NTA, or a combination thereof, may provide a desirable level of set retardation.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A method of cementing in a subterranean formation penetrated by a well bore comprising:
   providing a cement composition comprising water, a cement, a strength-retrogression additive, and a set retarder composition comprising an acid selected from the group consisting of: ethylenediamine tetra acetic acid, nitrilotriacetic acid, and combinations thereof;
   introducing the cement composition into the subterranean formation;
   allowing the cement composition to set therein; and
   retarding the setting of the cement composition using at least the set retarder composition comprising the acid.

2. The method of claim 1 wherein the well bore has a bottom hole circulating temperature of greater than about 200° F.

3. The method of claim 1 wherein the well bore has a bottom hole circulating temperature in the range of from about 450° F. to about 700° F.

4. The method of claim 1 wherein the cement is selected from the group consisting of: a Portland cement, a pozzalonic cement, a gypsum cement, a high alumina content cement, a silica cement, and combinations thereof.

5. The method of claim 1 wherein the strength retrogression agent comprises a silica.

6. The method of claim 1 wherein the cement composition further comprises an additional set retarder composition.

7. The method of claim 6 wherein the additional set retarder composition is selected from the group consisting of: a lignosulfate, a hydroxycarboxy acid, a phosphonic acid derivative, a borate salt, a synthetic polymer, and combinations thereof.

8. The method of claim 6 wherein the additional set retarder composition is selected from the group consisting of: a tartaric acid, a gluconic acid, a citric acid, a gluconoheptanoic acid, and combinations thereof.

9. The method of claim 1 wherein the acid is ethylenediamine tetra acetic acid.

10. The method of claim 1 wherein the ethylenediamine tetra acetic acid is present in the cement composition in an amount in the range of from about 0.01% to about 10% by weight of the cement.

11. The method of claim 1 wherein the acid is nitrilotriacetic acid.

12. The method of claim 1 wherein the nitrilotriacetic acid is present in the cement composition in an amount in the range of from about 0.01% to about 10% by weight of the cement.

13. The method of claim 1 wherein the acid comprises ethylenediamine tetra acetic acid and nitrilotriacetic acid in an ethylenediamine tetra acetic acid to nitrilotriacetic acid weight ratio in the range of from about 1:5 by weight to about 5:1 by weight.

14. The method of claim 1 wherein the acid comprises ethylenediamine tetra acetic acid and nitrilotriacetic acid in an ethylenediamine tetra acetic acid to nitrilotriacetic acid weight ratio in the range of from about 1:2 by weight to about 2:1 by weight.

15. The method of claim 1 wherein the cement composition further comprises a copolymer comprising olefinically unsaturated non-acrylate sulfonate monomers and olefinically unsaturated carboxylic acid monomers.

16. The method of claim 15 wherein the well bore has a bottom hole circulating temperature of greater than about 525° F.

17. The method of claim 15 wherein the copolymer is a styrene sulfonic acid and maleic anhydride copolymer.

18. The method of claim 17 wherein the copolymer has a styrene monomer to a maleic anhydride mole ratio of about 1:1.

19. The method of claim 15 wherein the olefinically unsaturated non-acrylate sulfonate monomers are selected from the group consisting of: a sulfonated styrene, a vinyltoluenesulfonic acid, a vinylnapthalenesulfonic acid, an allyloxylbenzenesulfonic acid, a 3-allyloxy-2-hydroxypropane sulfonic acid, and allylsulfonic acid.

20. The method of claim 15 wherein the olefinically unsaturated carboxylic acid monomers are selected from the group consisting of: an acrylic acid, a methacrylic acid, an ethacrylic acid, an alpha-chloro-acrylic acid, an alpha-cyano acrylic acid, an alpha-chloro-methacrylic acid, an alpha-cyano methacrylic acid, a crotonic acid, an alpha-phenyl acrylic acid, a beta-acryloxy propionic acid, a sorbic acid, an alpha-chloro sorbic acid, an angelic acid, a cinnamic acid, a p-chloro cinnamic acid, a beta-styryl acrylic acid, an itaconic acid, a citraconic acid, a mesaconic acid, a glutaconic acid, an aconitic acid, a fumaric acid, and a tricarboxy ethylene.

21. The method of claim 15 wherein the olefinically unsaturated carboxylic acid monomers are selected from the group consisting of: a maleic acid, a maleimide, a diester of maleic acid, a monoester of maleic acid, an amide derivative of maleic acid, an unsubstituted acrylic acid, an alkyl acrylic acid, and derivatives thereof.

22. The method of claim 15 wherein the mole ratio of the olefinically unsaturated non-acrylate sulfonate monomers to the olefinically unsaturated carboxylic acid monomers is in the range of from about 100:1 to about 1:100.

23. The method of claim 15 wherein the mole ratio of the olefinically unsaturated non-acrylate sulfonate monomers to the olefinically unsaturated carboxylic acid monomers is in the range of from about 3:1 to about 1:3.

24. The method of claim 15 wherein the copolymer is present in the cement composition in an amount in the range of from about 0.01% to about 10% by weight of the cement.

25. The method of claim 15 wherein the copolymer is present in the cement composition in an amount in the range of from about 0.1% to about 6% by weight of the cement.

26. The method of claim 1 wherein the cement composition further comprises an additional set retarder composition comprising a tartaric acid, and the cement composition further comprises a styrene sulfonic acid and maleic anhydride copolymer.

27. A method of cementing in a subterranean formation penetrated by a well bore comprising:
providing a cement composition comprising water, a cement, a strength-retrogression additive, and a set retarder composition comprising ethylenediamine tetra acetic acid;
introducing the cement composition into the subterranean formation;
allowing the cement composition to set therein; and
retarding the setting of the cement composition using at least the set retarder composition comprising the ethylenediamine tetra acetic acid.

28. The method of claim 27 wherein the well bore has a bottom hole circulating temperature of greater than about 200° F.

29. The method of claim 27 wherein the well bore has a bottom hole circulating temperature in the range of from about 450° F. to about 700° F.

30. The method of claim 27 wherein the cement is selected from the group consisting of: a Portland cement, a pozzalonic cement, a gypsum cement, a high alumina content cement, a silica cement, and combinations thereof.

31. The method of claim 27 wherein the strength retrogression agent comprises a silica.

32. The method of claim 27 wherein the cement composition further comprises an additional set retarder composition.

33. The method of claim 32 wherein the additional set retarder composition is selected from the group consisting of: a lignosulfate, a hydroxycarboxy acid, a phosphonic acid derivative, a borate salt, a synthetic polymer, and combinations thereof.

34. The method of claim 27 wherein the ethylenediamine tetra acetic acid is present in the cement composition in an amount in the range of from about 0.01% to about 10% by weight of the cement.

35. The method of claim 27 wherein the set retarder composition further comprises nitrilotriacetic acid.

36. The method of claim 35 wherein the nitrilotriacetic acid is present in the cement composition in an amount in the range of from about 0.01% to about 10% by weight of the cement.

37. The method of claim 35 wherein the set retarder compositions comprises the ethylenediamine tetra acetic acid and the nitrilotriacetic acid in an ethylenediamine tetra acetic acid to nitrilotriacetic acid weight ratio in the range of from about 1:5 by weight to about 5:1 by weight.

38. The method of claim 27 wherein the cement composition further comprises a copolymer comprising olefinically unsaturated non-acrylate sulfonate monomers and olefinically unsaturated carboxylic acid monomers.

39. The method of claim 38 wherein the well bore has a bottom hole circulating temperature of greater than about 525° F.

40. The method of claim 38 wherein the copolymer is a styrene sulfonic acid and maleic anhydride copolymer.

41. The method of claim 40 wherein the copolymer has a styrene monomer to maleic anhydride mole ratio of about 1:1.

42. The method of claim 38 wherein the copolymer is present in the cement composition in an amount in the range of from about 0.01% to about 10% by weight of the cement.

43. A method of cementing in a subterranean formation penetrated by a well bore comprising:
providing a cement composition comprising water, a cement, a strength-retrogression additive, and a set retarder composition comprising nitrilotriacetic acid;
introducing the cement composition into the subterranean formation;
allowing the cement composition to set therein; and
retarding the setting of the cement composition using at least the set retarder composition comprising the nitrilotriacetic acid.

44. The method of claim 43 wherein the well bore has a bottom hole circulating temperature of greater than about 200° F.

45. The method of claim 43 wherein the well bore has a bottom hole circulating temperature in the range of from about 450° F. to about 700° F.

46. The method of claim 43 wherein the cement is selected from the group consisting of: a Portland cement, a pozzalonic cement, a gypsum cement, a high alumina content cement, a silica cement, and combinations thereof.

47. The method of claim 43 wherein the strength retrogression agent comprises a silica.

48. The method of claim 43 wherein the cement composition further comprises an additional set retarder composition.

49. The method of claim 48 wherein the additional set retarder composition is selected from the group consisting of: a lignosulfate, a hydroxycarboxy acid, a phosphonic acid derivative, a borate salt, a synthetic polymer, and combinations thereof.

50. The method of claim 43 wherein the nitrilotriacetic acid is present in the cement composition in an amount in the range of from about 0.01% to about 10% by weight of the cement.

51. The method of claim 43 wherein the set retarder composition further comprises ethylenediamine tetra acetic acid.

52. The method of claim 51 wherein the ethylenediamine tetra acetic acid is present in the cement composition in an amount in the range of from about 0.01% to about 10% by weight of the cement.

53. The method of claim 51 wherein the set retarder compositions comprises the ethylenediamine tetra acetic acid and the nitrilotriacetic acid in an ethylenediamine tetra acetic acid to nitrilotriacetic acid weight ratio in the range of from about 1:5 by weight to about 5:1 by weight.

54. The method of claim 43 wherein the cement composition further comprises a copolymer comprising olefinically unsaturated non-acrylate sulfonate monomers and olefinically unsaturated carboxylic acid monomers.

55. The method of claim 54 wherein the well bore has a bottom hole circulating temperature of greater than about 525° F.

56. The method of claim 54 wherein the copolymer is a styrene sulfonic acid and maleic anhydride copolymer.

57. The method of claim 56 wherein the copolymer has a styrene monomer to maleic anhydride mole ratio of about 1:1.

58. The method of claim 54 wherein the copolymer is present in the cement composition in an amount in the range of from about 0.01% to about 10% by weight of the cement.

* * * * *